United States Patent [19]
Bartley et al.

[11] Patent Number: 5,727,231
[45] Date of Patent: Mar. 10, 1998

[54] METHOD FOR PERSONALIZING INTEGRATED CIRCUIT DEVICES

[75] Inventors: Gerald K. Bartley; Delbert R. Cecchi, both of Rochester, Minn.; Jeffrey A. Collett, Green Bay, Wis.; Linda S. Herman, Poughkeepsie, N.Y.; David O. Lewis; Glenn W. Sellers, both of Rochester, Minn.

[73] Assignee: International Business Machines Corporation, Armonk, N.Y.

[21] Appl. No.: 651,019

[22] Filed: May 21, 1996

Related U.S. Application Data

[63] Continuation of Ser. No. 276,018, Jul. 15, 1994, abandoned.

[51] Int. Cl.$^6$ .......................... G06F 13/374; G06F 13/10
[52] U.S. Cl. .................... 395/858; 364/DIG. 1; 364/DIG. 2; 364/488
[58] Field of Search .......................... 395/80 D, 200.1, 395/892, 500, 183.2, 893, 887, 281, 180, 900, 200.01, 750.1, 309, 50 D, 508, 858, 401, 421.04, 430, 27, 22, 24; 365/200; 455/38.3, 54.1; 364/DIG. 1, DIG. 2, 481, 550, 489, 488; 371/25.1; 437/54; 340/825.25, 825.31; 370/408, 419, 438

[56] References Cited

U.S. PATENT DOCUMENTS

| | | | |
|---|---|---|---|
| 4,605,872 | 8/1986 | Rung | 327/525 |
| 4,667,404 | 5/1987 | Reisman et al. | 29/847 |
| 4,706,189 | 11/1987 | Brackman | 395/892 |
| 4,764,644 | 8/1988 | Reisman et al. | 174/253 |
| 4,839,820 | 6/1989 | Kinoshita et al. | 364/491 |
| 4,859,806 | 8/1989 | Smith | 174/261 |
| 4,964,033 | 10/1990 | Williams | 395/800 |
| 4,984,291 | 1/1991 | Dias et al. | 455/38.3 |
| 5,074,037 | 12/1991 | Sutcliffe et al. | 364/491 |
| 5,099,196 | 3/1992 | Longwell et al. | 324/537 |
| 5,124,175 | 6/1992 | Miracky et al. | 427/98 |
| 5,165,166 | 11/1992 | Carey | 174/261 |
| 5,305,446 | 4/1994 | Lanch et al. | 395/425 |
| 5,340,767 | 8/1994 | Flaherty | 437/54 |
| 5,392,245 | 2/1995 | Manning | 365/200 |

OTHER PUBLICATIONS

Drop, J.G., Integrated Circuit Personalization At The Module Level, *IBM Technical Disclosure Bulletin*, vol. 17, No. 5, Oct., 1974, pp. 1344–1345.

Chang, et al., Personalizing Prepackaged Semiconductor Devices, *IBM Technical Disclosure Bulletin*, vol. 17, No. 7, Dec. 1974, pp. 1950–1951.

*Primary Examiner*—Daniel H. Pan
*Attorney, Agent, or Firm*—Felsman, Bradley, Gunter & Dillon

[57] ABSTRACT

A customizable integrated circuit device is disclosed that is capable of having unique data selected for controlling the functionality or configurability of the integrated circuit. The integrated circuit device has a microcontroller unit, a plurality of function units, coupled to the microcontroller unit, and a novel customization logic unit, also coupled to the microcontroller unit. A plurality of signal selectors, further coupled to the customization logic, either on the integrated circuit or on the mounting module to which the integrated circuit is affixed, are selected to control a signal generated by the customization logic to the microcontroller. The customization logic unit may use data that represents a serial number, performance characteristics, such as operational speed, or qualified external working configurations, such as mainstore or caching configurations, associated with the integrated circuit and as selected by the signal selectors.

7 Claims, 1 Drawing Sheet

METHOD FOR PERSONALIZING INTEGRATED CIRCUIT DEVICES

This is a continuation of application Ser. No. 08/276,018, filed 15 Jul. 1994, now abandoned.

BACKGROUND OF THE INVENTION

1. Technical Field

This invention relates generally to the fabrication of integrated circuit devices having multiple feature or function assets and, more specifically, to a method for personalizing the integrated circuit devices having the multiple assets. More particularly still, the present invention relates to the personalization or customization of integrated circuits from a single design point to provide multiple system personalities while protecting against the use of assets not activated by the chip designer or manufacturer.

2. Description of the Related Art

The customization or personalization of integrated circuits is well known in the art. This process or design is used to develop a single design point for a family of systems. This single design point may be customized such that certain features or functions are included or excluded to produce model differentiation from the high end units.

One method for manufacturing customizable integrated circuits is to fabricate the circuits to the point where the only remaining processing steps are the formation of metalization layers to connect the circuits electrically. This partially completed wafer is then placed in inventory until it is sold to the ultimate customer as a semi-custom integrated circuit. The integrated circuit is then customized with the specification of particular metalization masks and the formation of the special metalization layers, which electrically connect the circuits to respond in the manner desired by the customer. A computer-aided design program may be used to personalize the integrated circuits and to aid in defining or forming the final metalization mask, as is well known in the industry.

The time, effort and expense required to produce these metalization layer masks is significant, because each of the several metalization layer masks must be custom designed for each different type of integrated circuit or semiconductor chip package. There are problems with this method, which include design problems, fabrication problems, manufacture and testing problems, which all must be solved for each circuit or package.

The second method for customizing integrated circuit devices is to customize the connections between wiring planes superimposed on a substrate. For example, a first wiring plane having multiple conductors is formed upon a substrate and an insulating layer is formed over the first wiring plane. Next, a second wiring plane having multiple conductors is formed above the insulating layer with multiple conductors electrically connected to the first wiring plane. The connections then may be modified by breaking selected ones of the electrical connections between the first and second wiring planes to customize the electrical interconnections. A laser is typically used to break the electrical connection by removing the metal forming the electrical connection at the particular conductor location to be broken.

Yet another technique for customizing an integrated circuit device is to enable a function on the IC device with a dedicated I/O pin. For chips where the function is to be accessed, an I/O pin will be employed from the module upon which the chip is mounted. For modules in which the I/O function is eliminated, the feature is also eliminated. This method is performed today with wire bonded chips. Other chips, however, use a bonding pad and a different module substrate, which requires a different module substrate for each different I/O pin that is not brought out. If there are many I/O pins being used to personalize multiple unique functions on a particular chip, the cost of all the module substrates becomes prohibitive. Yet another technique is to release different chips with the functions disabled; however, the cost for a separate chip is much higher than a module substrate. Thus, this approach is also inefficient due to high cost. Yet another approach, which is more cost effective, is to enable the function via a module I/O pin. This method has problems in that anyone connecting that I/O pin to a particular circuit enables the function that, otherwise, should not be enabled as it was desired by the manufacturer to limit the function to only those who paid for it.

Accordingly, what is needed is a method of personalizing integrated circuit devices that does not add to the complexity of many masking steps for the customization or for the need to make many interconnect modifications via a laser. Additionally, what is needed is a cost effective method for customizing integrated circuit devices that does not allow the customization to be defeated, thus allowing a customer to use more functions or features in an integrated circuit device than was otherwise entitled.

SUMMARY OF THE INVENTION

One object of the present invention relates generally to the fabrication of integrated circuit devices having several feature or function assets.

It is another object of the present invention to provide a method for personalizing the integrated circuit devices having the multiple features or functions.

It is yet another object of the present invention to provide personalization or customization of the integrated circuits from a single design point to provide multiple system personalities without tampering by the end user.

The above as well as additional objectives, features, and advantages of the present invention will become apparent in the following detailed written description. According to the present invention, a customizable integrated circuit device is disclosed that is capable of having unique data selected for controlling the functionality or configurability of the integrated circuit. The integrated circuit device has a microcontroller unit, a plurality of function units, coupled to the microcontroller unit, and a novel customization logic unit, also coupled to the microcontroller unit. The customization logic unit is used to generate a signal sent to the microcontroller unit for controlling which of the plurality of function units are to be used or accessed. A plurality of signal selectors, further coupled to the customization logic, either on the integrated circuit or on the mounting module to which the integrated circuit is affixed, are enabled to control the generated signal sent by the customization logic. The customization logic uses an enabling driver for placing a first signal on each of the signal selectors. Each signal selector is further attached to a pull-up receiver for selectively altering the signal generated from the enabling driver. A storage latch is used to hold the signal from the customization logic unit before it is sent to the microcontroller.

The microprocessor unit and customization logic unit typically are fabricated in a semiconductor integrated circuit chip. The IC chip may be further mounted to a module mount for coupling the IC chip to an electronic device. The signal selectors typically are on the mounting module and use laser fuses for selecting a desired logic symbol.

The customization logic unit may use data that represents a serial number, performance characteristics, such as operational speed, or qualified external working configurations, such as mainstore or caching configurations, associated with the integrated circuit and as selected by the signal selectors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
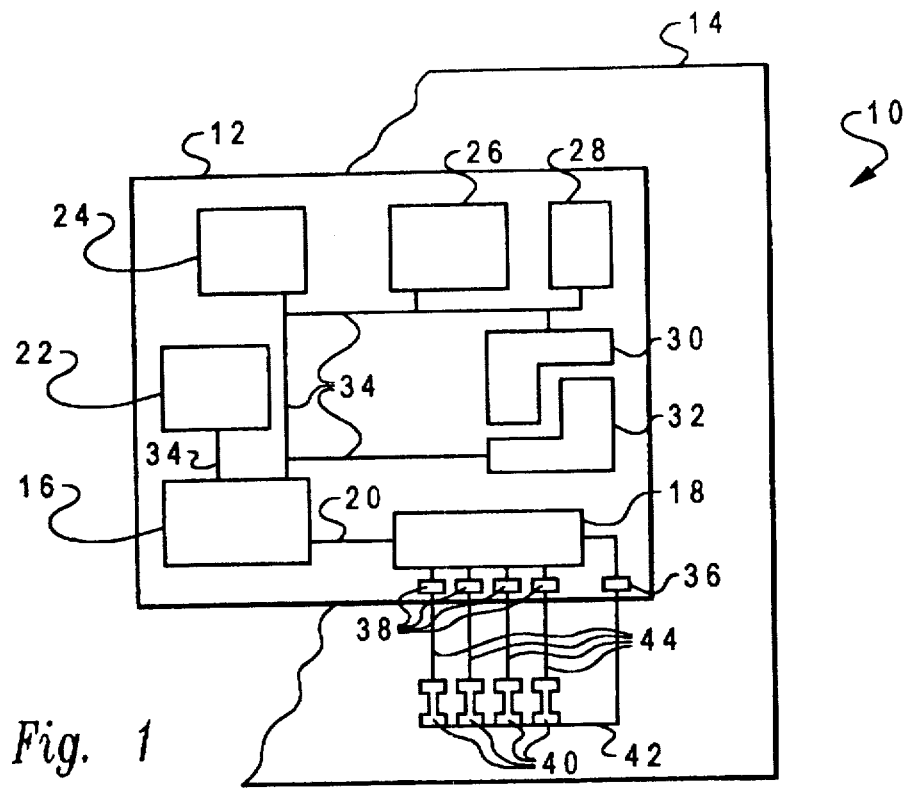
FIG. 1 depicts a block diagram of an integrated circuit device according to the present invention.

According to FIG. 1, an integrated circuit device 10 having specific personalization logic is depicted. The integrated circuit device 10 comprises an integrated circuit chip 12 mounted on a module 14. The module 14 may be any type mounting material such as, for example, plastic, carbon, or ceramic. In this example, the module is a multilayer ceramic module.

Within the integrated circuit 12, there are a plurality of functions and features that are controlled by microcontroller 16. The personalization of the plurality of functions and features is controlled by customization logic 18, which connects to the microcontroller 16 via data line 20. The plurality of functions and features are represented by blocks 22, 24, 26, 28, 30, and 32 which are all connected to microcontroller 16 via bus lines 34. The fabrication of chip 12 and the construction of features 22–32 and microcontroller 16 are well known to those skilled in the art. The functions amongst the blocks 22–32 may include, for example, an arithmetic logic unit, a memory caching system, a timing unit, a memory management unit, a video graphics accelerator, or a any other type feature or function contemplated by the designer of the chip. The customization logic 18 includes means for generating a unique signal, which, when sent to microcontroller 16, instructs the microcontroller 16 through microcodes stored in microcontroller 16, to access one or more functions or features, or any combination of the plurality, or all of the functions and features, designed in integrated circuit chip 12.

Additionally, in FIG. 1, a pattern driver pad and four pull-up receiver pads 38 are placed on integrated circuit chip 12 and are connected to the customization logic 18. The receiver pads 38, are further connected to laser delete pads 40, which are also connected to the driver pad 36 via driver pad connect 42. The receiver pads are connected to the laser delete pads 40 via signal lines 44. The customization logic 18 is further depicted in FIG. 2.

Figure 2:
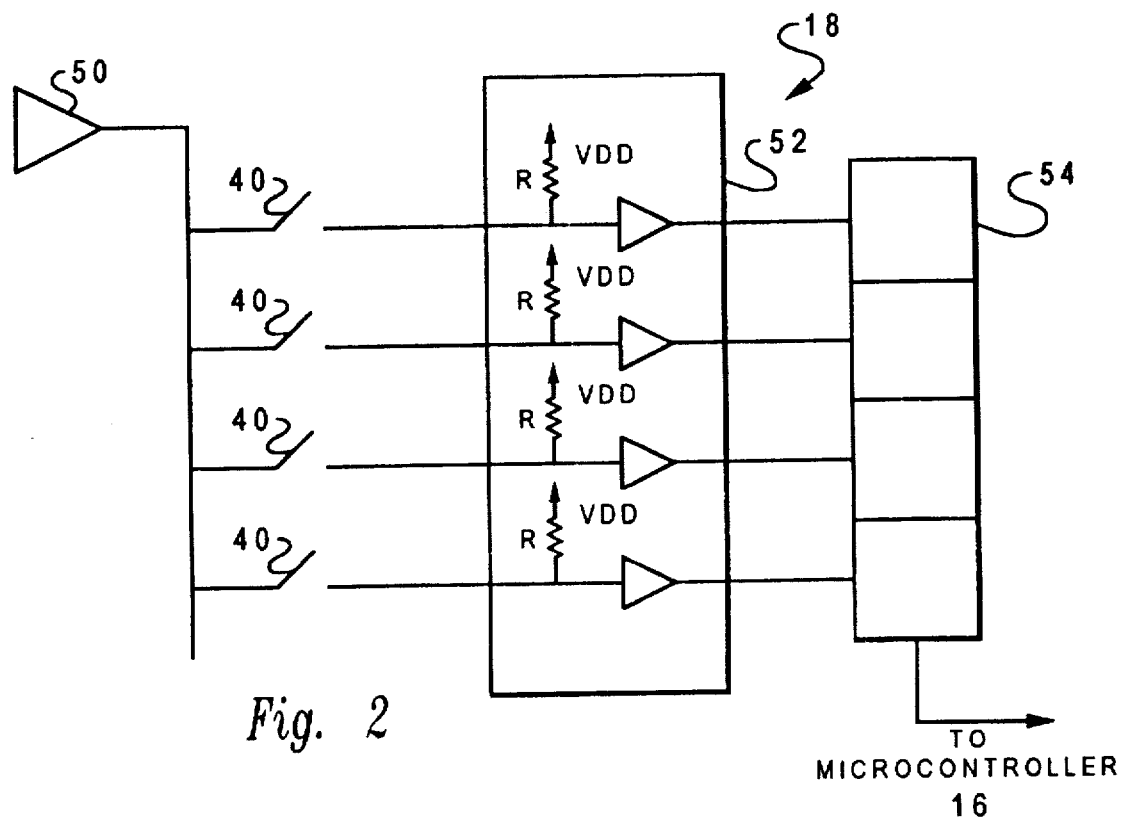
FIG. 2 is a schematic diagram of the personalization circuit depicted in FIG. 1.

FIG. 2 depicts a schematic diagram of customization logic 18, as connected to laser delete pads 40. Customization logic 18 includes an enabling driver 50 for providing a signal on the laser delete pads 40 and their respective signal lines 44 (not shown). Logic circuit 18 further includes pull-up receivers 52, which may include a tie-up or tie-down resistor R for each line to pull the logical signal towards the opposite level as that of the enabling driver 50 in the event that a laser delete pad connection has been broken. The signal on the lines is then fed through storage latches 54, which then feed the signal to the microcontroller 16. The microcontroller 16 takes the signal from the storage latches 54 and decodes it based on the microcodes stored therein to determine which functional units 22–32 are to be used in the integrated circuit chip 12. In this example, the four lines provide a 4-bit signal, which yields 16 different combinations that can be selected by merely severing one or more of the laser delete pads 40. Once the delete lines have been selected, they are encapsulated in the module 14 so that they cannot be tampered with. This approach allows the personalization to be moved towards the end of the production process, thus providing for a shorter turnaround time in terms of serviceability.

This further allows the designer and manufacturer to decide what model or features the module will represent at a state during the last few weeks of production, instead of at the beginning of production typically necessary in the prior methods. Additionally, this allows a manufacturer to design a single set of functions and features within a chip that can then be customized to provide a family of features and flavors available to the end user, without using the ability to protect the assets that the manufacturer has enabled in his chips, yet disabled by way of providing features that the user is willing to pay for but not adding features that the user is unwilling to pay for. Additionally, since the customization can occur on the module, rather than on the chip itself, the manufacturer is able to increase efficiency yields since the delicate finalization steps done near the completion of the fabrication process is thus eliminated. Of course, the laser deletion pads 40 may be mounted on the integrated circuit chip if so desired.

Another application of the custimization logic is to provide an electronic module serial number, such as, for example, a serial number based on sixteen bits. Each chip module can contain a uniqued module serial number that the system code can read. Software license management schemes rely on a unique electronic serial number encrypted as part of the software key. The selection of a serial number, through the laser delete pads, provides a non-alterable serial number for such a software license manager.

Further, the customization logic can be specified to select the module speed capabilities. For example, cycle time adjustment, which uses two bits, is performed once a test measuring the module's performances, such as sort speeds, is completed. The sort speeds can then be specified after the module is tested so that the module can be guaranteed to work at these speeds. This is specified by deleting the appropriate straps.

Additionally, delete straps can be used to specify the tested mainstore and external cache with which the module will work. This prevents the module from working with the wrong module components to build a nonworking, non-tested configuration because the module contains all of the configuration data as part of the delete information.

While the invention has been particularly shown and described with reference to a preferred embodiment, it will be understood by those skilled in the art that various changes in form and detail may be made therein without departing from the spirit and scope of the invention.

We claim:

1. A customizable integrated circuit device comprising:
   an integrated circuit chip including a microcontroller unit formed therein;
   M function units formed within said integrated circuit chip and coupled to said microcontroller unit;

a customization logic unit, coupled to said microcontroller unit, for generating a signal sent to said microcontroller unit for controlling which of said M function units are operational by means of microcodes stored within said microcontroller unit;

a mounting module, to which said integrated circuit chip is attached, for coupling said integrated circuit chip to an electronic system, and further comprising:

N signals selectors formed within said mounting module, coupled to said customization logic, for controlling said generated signal sent by said customization logic, wherein N is less than M.

2. The apparatus according to claim 1 wherein said customization logic unit further comprises an enabling driver for placing a first signal on each of said N signal selectors.

3. The customizable integrated circuit device according to claim 2 wherein said customizable logic unit further comprises a plurality of pull-up receivers, each coupled to one of said N signal selectors for selectively altering said first generated signal from said enabling driver.

4. The apparatus according to claim 1 wherein said customization logic unit further comprises a storage latch for receiving said generated signal and being further connected to said microcontroller unit.

5. A customizable integrated circuit device comprising:

a microcontroller unit;

M function units, coupled to said microcontroller unit;

a customization logic unit, coupled to said microcontroller unit, for generating a signal sent to said microcontroller unit for controlling which of said M function units are operational by means of microcodes stored in said microcontroller unit, said customization logic unit further including a storage latch for receiving said generated signal and being further connected to said microcontroller unit; and N signals selectors, coupled to said customization logic, for controlling said generated signal sent by said customization logic, wherein N is less than M.

6. The apparatus according to claim 5 wherein said customization logic unit further comprises an enabling driver for placing a first signal on each of said N signal selectors.

7. The customizable integrated circuit device according to claim 6 wherein said customizable logic unit further comprises a plurality of pull-up receivers, each coupled to one of said N signal selectors for selectively altering said first generated signal from said enabling driver.

* * * * *